(12) United States Patent
Gottschalk, Jr. et al.

(10) Patent No.: US 10,593,004 B2
(45) Date of Patent: *Mar. 17, 2020

(54) SYSTEM AND METHODS FOR IDENTIFYING COMPROMISED PERSONALLY IDENTIFIABLE INFORMATION ON THE INTERNET

(71) Applicant: CSIdentity Corporation, Austin, TX (US)

(72) Inventors: Harold E. Gottschalk, Jr., El Cajon, CA (US); Michael Caldwell, Ramona, CA (US); Joel Carleton, San Diego, CA (US)

(73) Assignee: CSIDENTITY CORPORATION, Austin, TX (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/625,883

(22) Filed: Jun. 16, 2017

(65) Prior Publication Data
US 2018/0130157 A1 May 10, 2018

Related U.S. Application Data

(63) Continuation of application No. 15/341,096, filed on Nov. 2, 2016, now Pat. No. 9,710,868, which is a
(Continued)

(51) Int. Cl.
*G06F 16/00* (2019.01)
*G06Q 50/26* (2012.01)
(Continued)

(52) U.S. Cl.
CPC ....... *G06Q 50/265* (2013.01); *G06F 16/9535* (2019.01); *G06F 21/6245* (2013.01); *H04L 63/1441* (2013.01)

(58) Field of Classification Search
CPC .................................................. G06F 16/9535
See application file for complete search history.

(56) References Cited

U.S. PATENT DOCUMENTS

| 2,074,513 A | 3/1937 | Mills |
| 3,316,395 A | 4/1967 | Lavin et al. |

(Continued)

FOREIGN PATENT DOCUMENTS

| DE | 91 08 341 | 10/1991 |
| EP | 0 554 083 | 8/1993 |

(Continued)

OTHER PUBLICATIONS

AAD et al., "NRC Data Collection and the Privacy by Design Principles", IEEE, Nov. 2010, pp. 5.
(Continued)

*Primary Examiner* — Ajith Jacob
(74) *Attorney, Agent, or Firm* — Knobbe, Martens, Olson & Bear, LLP

(57) ABSTRACT

In one embodiment, a method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

20 Claims, 5 Drawing Sheets

Related U.S. Application Data continuation of application No. 14/929,835, filed on Nov. 2, 2015, now Pat. No. 9,558,368, which is a continuation of application No. 13/398,471, filed on Feb. 16, 2012, now Pat. No. 9,235,728.

(60) Provisional application No. 61/444,433, filed on Feb. 18, 2011.

(51) Int. Cl.
*G06F 16/9535* (2019.01)
*H04L 29/06* (2006.01)
*G06F 21/62* (2013.01)

(56) References Cited

U.S. PATENT DOCUMENTS

| | | | |
|---|---|---|---|
| 3,752,904 A | 8/1973 | Waterbury | |
| 4,163,290 A | 7/1979 | Sutherlin et al. | |
| 5,274,547 A | 12/1993 | Zoffel et al. | |
| 5,323,315 A | 6/1994 | Highbloom | |
| 5,414,833 A | 5/1995 | Hershey et al. | |
| 5,454,030 A | 9/1995 | de Oliveira et al. | |
| 5,504,675 A | 4/1996 | Cragun et al. | |
| 5,563,783 A | 10/1996 | Stolfo et al. | |
| 5,627,886 A | 5/1997 | Bowman | |
| 5,679,940 A | 10/1997 | Templeton et al. | |
| 5,696,907 A | 12/1997 | Tom | |
| 5,696,965 A | 12/1997 | Dedrick | |
| 5,739,512 A | 4/1998 | Tognazzini | |
| 5,742,775 A | 4/1998 | King | |
| 5,745,654 A | 4/1998 | Titan | |
| 5,752,242 A | 5/1998 | Havens | |
| 5,754,632 A | 5/1998 | Smith | |
| 5,774,868 A | 6/1998 | Cragun et al. | |
| 5,809,478 A | 9/1998 | Greco et al. | |
| 5,819,226 A | 10/1998 | Gopinathan et al. | |
| 5,819,260 A | 10/1998 | Lu et al. | |
| 5,822,741 A | 10/1998 | Fischthal | |
| 5,832,068 A | 11/1998 | Smith | |
| 5,842,178 A | 11/1998 | Giovannoli | |
| 5,870,721 A | 2/1999 | Norris | |
| 5,872,921 A | 2/1999 | Zahariev et al. | |
| 5,878,403 A | 3/1999 | DeFrancesco | |
| 5,879,297 A | 3/1999 | Haynor et al. | |
| 5,884,289 A | 3/1999 | Anderson et al. | |
| 5,912,839 A | 6/1999 | Ovshinslw et al. | |
| 5,913,196 A | 6/1999 | Talmor et al. | |
| 5,943,666 A | 8/1999 | Kleewein et al. | |
| 5,950,179 A | 9/1999 | Buchanan et al. | |
| 5,987,440 A | 11/1999 | O'Neil et al. | |
| 5,999,907 A | 12/1999 | Donner | |
| 5,999,940 A | 12/1999 | Ranger | |
| 6,023,694 A | 2/2000 | Kouchi et al. | |
| 6,029,139 A | 2/2000 | Cunningham et al. | |
| 6,029,149 A | 2/2000 | Dykstra et al. | |
| 6,029,154 A | 2/2000 | Pettitt | |
| 6,029,194 A | 2/2000 | Tilt | |
| 6,044,357 A | 3/2000 | Garg | |
| 6,055,570 A | 4/2000 | Nielsen | |
| 6,094,643 A | 7/2000 | Anderson et al. | |
| 6,119,103 A | 9/2000 | Basch et al. | |
| 6,125,985 A | 10/2000 | Amdahl et al. | |
| 6,142,283 A | 11/2000 | Amdahl et al. | |
| 6,144,988 A | 11/2000 | Kappel | |
| 6,157,707 A | 12/2000 | Baulier et al. | |
| 6,182,219 B1 | 1/2001 | Feldbau et al. | |
| 6,249,228 B1 | 6/2001 | Shirk et al. | |
| 6,253,203 B1 | 6/2001 | O'Flaherty et al. | |
| 6,254,000 B1 | 7/2001 | Degen et al. | |
| 6,263,447 B1 | 7/2001 | French et al. | |
| 6,269,349 B1 | 7/2001 | Aieta et al. | |
| 6,282,658 B2 | 8/2001 | French et al. | |
| 6,285,983 B1 | 9/2001 | Jenkins | |
| 6,285,987 B1 | 9/2001 | Roth et al. | |
| 6,292,795 B1 | 9/2001 | Peters et al. | |
| 6,311,169 B2 | 10/2001 | Duhon | |
| 6,317,783 B1 | 11/2001 | Freishtat et al. | |
| 6,321,339 B1 | 11/2001 | French et al. | |
| 6,330,546 B1 | 12/2001 | Gopinathan et al. | |
| 6,397,197 B1 | 5/2002 | Gindlesperger | |
| 6,418,436 B1 | 7/2002 | Degen et al. | |
| 6,424,956 B1 | 7/2002 | Werbos | |
| 6,448,889 B1 | 9/2002 | Hudson | |
| 6,456,984 B1 | 9/2002 | Demoff et al. | |
| 6,496,936 B1 | 12/2002 | French et al. | |
| 6,505,193 B1 | 1/2003 | Musgrave et al. | |
| 6,510,415 B1 | 1/2003 | Talmor et al. | |
| 6,513,018 B1 | 1/2003 | Culhane | |
| 6,532,459 B1 | 3/2003 | Berson | |
| 6,542,894 B1 | 4/2003 | Lee et al. | |
| 6,543,683 B2 | 4/2003 | Hoffman | |
| 6,553,495 B1 | 4/2003 | Johansson et al. | |
| 6,571,334 B1 | 5/2003 | Feldbau et al. | |
| 6,597,775 B2 | 7/2003 | Lawyer et al. | |
| 6,612,488 B2 | 9/2003 | Suzuki | |
| 6,615,193 B1 | 9/2003 | Kingdon et al. | |
| 6,658,393 B1 | 12/2003 | Basch et al. | |
| 6,700,220 B2 | 3/2004 | Bayeur et al. | |
| 6,714,918 B2 | 3/2004 | Hillmer et al. | |
| 6,735,572 B2 | 5/2004 | Landesmann | |
| 6,740,875 B1 | 5/2004 | Ishikawa et al. | |
| 6,748,426 B1 | 6/2004 | Shaffer et al. | |
| 6,751,626 B2 | 6/2004 | Brown et al. | |
| 6,796,497 B2 | 9/2004 | Benkert et al. | |
| 6,811,082 B2 | 11/2004 | Wong | |
| 6,829,711 B1 | 12/2004 | Kwok et al. | |
| 6,850,606 B2 | 2/2005 | Lawyer et al. | |
| 6,857,073 B2 | 2/2005 | French et al. | |
| 6,866,586 B2 | 3/2005 | Oberberger et al. | |
| 6,871,287 B1 | 3/2005 | Ellingson | |
| 6,873,979 B2 | 3/2005 | Fishman et al. | |
| 6,898,574 B1 | 5/2005 | Regan | |
| 6,907,408 B2 | 6/2005 | Angel | |
| 6,908,030 B2 | 6/2005 | Rajasekaran et al. | |
| 6,913,194 B2 | 7/2005 | Suzuki | |
| 6,918,038 B1 | 7/2005 | Smith et al. | |
| 6,920,435 B2 | 7/2005 | Hoffman et al. | |
| 6,928,546 B1 | 8/2005 | Nanavati et al. | |
| 6,930,707 B2 | 8/2005 | Bates et al. | |
| 6,934,849 B2 | 8/2005 | Kramer et al. | |
| 6,934,858 B2 | 8/2005 | Woodhill | |
| 6,965,881 B1 | 11/2005 | Brickell et al. | |
| 6,965,997 B2 | 11/2005 | Dutta | |
| 6,973,462 B2 | 12/2005 | Dattero et al. | |
| 6,973,575 B2 | 12/2005 | Arnold | |
| 6,983,381 B2 | 1/2006 | Jerdonek | |
| 6,983,882 B2 | 1/2006 | Cassone | |
| 6,991,174 B2 | 1/2006 | Zuili | |
| 6,993,659 B2 | 1/2006 | Milgramm et al. | |
| 7,007,174 B2 | 2/2006 | Wheeler et al. | |
| 7,028,052 B2 | 4/2006 | Chapman et al. | |
| 7,035,855 B1 | 4/2006 | Kilger et al. | |
| 7,069,240 B2 | 6/2006 | Spero et al. | |
| 7,083,090 B2 | 8/2006 | Zuili | |
| 7,089,592 B2 | 8/2006 | Adjaoute et al. | |
| 7,092,891 B2 | 8/2006 | Maus et al. | |
| 7,104,444 B2 | 9/2006 | Suzuki | |
| 7,158,622 B2 | 1/2007 | Lawyer et al. | |
| 7,162,640 B2 | 1/2007 | Heath et al. | |
| 7,174,335 B2 | 2/2007 | Kameda | |
| 7,188,078 B2 | 3/2007 | Arnett et al. | |
| 7,203,653 B1 | 4/2007 | McIntosh | |
| 7,212,995 B2 | 5/2007 | Schulkins | |
| 7,222,779 B1 | 5/2007 | Pineda-Sanchez et al. | |
| 7,225,977 B2 | 6/2007 | Davis | |
| 7,234,156 B2 | 6/2007 | French et al. | |
| 7,240,059 B2 | 7/2007 | Bayliss et al. | |
| 7,240,363 B1 | 7/2007 | Ellingson | |
| 7,246,067 B2 | 7/2007 | Austin et al. | |
| 7,246,740 B2 | 7/2007 | Swift et al. | |
| 7,254,560 B2 | 8/2007 | Singhal | |
| 7,263,506 B2 | 8/2007 | Lee et al. | |
| 7,272,857 B1 | 9/2007 | Everhart | |

(56) References Cited

U.S. PATENT DOCUMENTS

| | | |
|---|---|---|
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |
| 7,383,227 B2 | 6/2008 | Weinflash et al. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,418,431 B1 | 8/2008 | Nies et al. |
| 7,428,509 B2 | 9/2008 | Klebanoff |
| 7,433,855 B2 | 10/2008 | Gavan et al. |
| 7,433,864 B2 | 10/2008 | Malik |
| 7,438,226 B2 | 10/2008 | Helsper et al. |
| 7,444,518 B1 | 10/2008 | Dharmarajan et al. |
| 7,457,401 B2 | 11/2008 | Lawyer et al. |
| 7,458,508 B1 | 12/2008 | Shao et al. |
| 7,466,235 B1 | 12/2008 | Kolb et al. |
| 7,467,401 B2 | 12/2008 | Cicchitto |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,580,884 B2 | 8/2009 | Cook |
| 7,581,112 B2 | 8/2009 | Brown et al. |
| 7,584,146 B1 | 9/2009 | Duhon |
| 7,587,368 B2 | 9/2009 | Felsher |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,690,032 B1 | 3/2010 | Peirce |
| 7,701,364 B1 | 4/2010 | Zilberman |
| 7,702,550 B2 | 4/2010 | Perg et al. |
| 7,707,163 B2 | 4/2010 | Anzalone et al. |
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,515 B1 | 8/2010 | Kumar et al. |
| 7,788,184 B2 | 8/2010 | Kane |
| 7,792,715 B1 | 9/2010 | Kasower |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B1 | 9/2010 | Merrell et al. |
| 7,805,391 B2 | 9/2010 | Friedlander et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,844,520 B1 | 11/2010 | Franklin |
| 7,848,987 B2 | 12/2010 | Haig |
| 7,849,029 B2 | 12/2010 | Crooks et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,874,488 B2 | 1/2011 | Parkinson |
| 7,877,304 B1 | 1/2011 | Coulter |
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |

(56) References Cited

U.S. PATENT DOCUMENTS

| | | |
|---|---|---|
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,543,499 B2 | 9/2013 | Haggerty et al. |
| 8,548,137 B2 | 10/2013 | Zoldi et al. |
| 8,549,590 B1 | 10/2013 | De Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,725,613 B1 | 5/2014 | Celka et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,918,891 B2 | 12/2014 | Coggeshall et al. |
| 8,949,981 B1 | 2/2015 | Trollope et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,773,227 B2 | 9/2017 | Zoldi et al. |
| 9,953,321 B2 | 4/2018 | Zoldi et al. |
| 10,043,213 B2 | 8/2018 | Straub et al. |
| 10,089,679 B2 | 10/2018 | Eisen |
| 10,089,686 B2 | 10/2018 | Straub et al. |
| 10,102,530 B2 | 10/2018 | Zoldi et al. |

(56) References Cited

U.S. PATENT DOCUMENTS

| | | |
|---|---|---|
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Duffield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0153663 A1 | 8/2004 | Clark et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0254868 A1 | 12/2004 | Kirkland et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0050577 A1 | 3/2005 | Westbrook et al. |
| 2005/0058262 A1 | 3/2005 | Timmins et al. |
| 2005/0065874 A1 | 3/2005 | Lefner et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |

(56) References Cited

U.S. PATENT DOCUMENTS

| | | |
|---|---|---|
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004622 A1 | 1/2006 | Fanelli |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0287902 A1 | 12/2006 | Helsper et al. |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106517 A1 | 5/2007 | Cluff et al. |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0124270 A1 | 5/2007 | Page |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |

(56) References Cited

U.S. PATENT DOCUMENTS

| | | |
|---|---|---|
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0140576 A1 | 6/2008 | Lewis et al. |
| 2008/0147454 A1 | 6/2008 | Walker et al. |
| 2008/0154758 A1 | 6/2008 | Schattmaier et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0126013 A1 | 5/2009 | Atwood et al. |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |
| 2009/0199264 A1 | 8/2009 | Lang |
| 2009/0204457 A1 | 8/2009 | Buhrmann et al. |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0004965 A1 | 1/2010 | Eisen |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |

(56) References Cited

U.S. PATENT DOCUMENTS

| | | |
|---|---|---|
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0145847 A1 | 6/2010 | Zarikian et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0060905 A1 | 3/2011 | Stack et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0290660 A1 | 11/2012 | Rao et al. |
| 2013/0004033 A1 | 1/2013 | Trugenberger et al. |
| 2013/0185293 A1 | 7/2013 | Boback |
| 2013/0218797 A1 | 8/2013 | Prichard et al. |
| 2014/0007238 A1 | 1/2014 | Magee et al. |
| 2014/0058910 A1 | 2/2014 | Abeles |
| 2014/0149304 A1 | 5/2014 | Bucholz et al. |
| 2015/0186901 A1 | 7/2015 | Miltonberger |
| 2015/0199784 A1 | 7/2015 | Straub et al. |
| 2015/0295924 A1 | 10/2015 | Gottschalk, Jr. |
| 2016/0012561 A1 | 1/2016 | Lappenbusch et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0328814 A1 | 11/2016 | Prichard et al. |
| 2016/0344758 A1 | 11/2016 | Cohen et al. |
| 2017/0099314 A1 | 4/2017 | Klatt et al. |
| 2017/0278182 A1 | 9/2017 | Kasower |
| 2017/0287065 A1 | 10/2017 | Samler et al. |
| 2017/0374076 A1 | 12/2017 | Pierson et al. |
| 2018/0101890 A1 | 4/2018 | Eisen |
| 2018/0322572 A1 | 11/2018 | Straub et al. |

FOREIGN PATENT DOCUMENTS

| | | |
|---|---|---|
| GB | 2 392 748 | 3/2004 |
| KR | 10-2004-0034063 | 4/2004 |
| TW | 256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/106393 | 9/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |

OTHER PUBLICATIONS

Haglund, Christoffer, "Two-Factor Authentication With a Mobile Phone", Fox Technologies, Uppsala, Department of Information Technology, Nov. 2, 2007, pp. 62.

Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.

Lefebvre et al., "A Robust Soft Hash Algorithm for Digital Image Signature", International Conference on Image Processing 2:11 (ICIP), vol. 3, Oct. 2003, pp. 495-498.

International Search Report and Written Opinion for Application No. PCT/US2012/025456, dated May 21, 2012.

International Search Report and Written Opinion for Application No. PCT/US2011/033940, dated Aug. 22, 2011.

"Fraud Alert | Learn How". Fight Identity Theft. http://www.fightidentitytheft.com/flag,html, accessed on Nov. 5, 2009.

LifeLock, "Personal Identity Theft Protection & Identity Theft Products," http://www.lifelock.com/lifelock-for-people, accessed Nov. 5, 2007.

(56) References Cited

OTHER PUBLICATIONS

Official Communication in Canadian Patent Application No. 2,827,478, dated May 31, 2018.
TheMorningCall.Com, "Cheap Ways to Foil Identity Theft," www.mcall.com/business/columnists/all-karp.5920748jul01.0 . . . , published Jul. 1, 2007.
U.S. Appl. No. 13/398,471, U.S. Pat. No. 9,235,728, System and Methods for Identifying Compromised Personally Identifiable Information on the Internet, filed Feb. 16, 2012.
U.S. Appl. No. 14/929,835, U.S. Pat. No. 9,558,368, System and Methods for Identifying Compromised Personally Identifiable Information on the Internet, filed Nov. 2, 2015.
U.S. Appl. No. 15/341,096, U.S. Pat. No. 9,710,868, System and Methods for Identifying Compromised Personally Identifiable Information on the Internet, filed Nov. 2, 2016.
Extended European Search Report for Application No. EP18207755, dated Dec. 13, 2018.
U.S. Appl. No. 12/705,489, filed Feb. 12, 2010, Bargoli et al.
U.S. Appl. No. 12/705,511, filed Feb. 12, 2010, Bargoli et al.
U.S. Appl. No. 09/557,252, filed Apr. 24, 2000, Page.
"A New Approach to Fraud Solutions", BasePoint Science Solving Fraud, pp. 8, 2006.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now: Money Matters, as broadcasted Nov. 15, 2005 with guest Todd Davis (CEO of Lifelock), pp. 6.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & the Bust-Out", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
eFunds Corporation, "Data & Decisioning: Debit Report" printed Apr. 1, 2007, http://www.efunds.com/web/industry-solutions/financial-services/frm-debit-report/htm in 1 page.
Equifax; "Equifax Credit Watch"; https://www.econsumer.equifax.co.uk/consumer/uk/sitepage.ehtml, dated Jun. 27, 2007 on www.archive.org.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.

"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Herzberg, Amir, "Payments and Banking with Mobile Personal Devices," Communications of the ACM, May 2003, vol. 46, No. 5, pp. 53-58.
"ID Analytics ID Network", from www.idanalytics.com, as retrieved from Internet Archive, dated Nov. 20, 2005 or earlier; attached as "ID Network (IDNb)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
LifeLock, "How LifeLock Works," http://www.lifelock.com/lifelock-for-people printed Mar. 14, 2008 in 1 page.

(56) References Cited

OTHER PUBLICATIONS

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit , Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.

Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
ShoeBoxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling The Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US09/37565, dated May 12, 2009.
Official Communication in Australian Patent Application No. 2012217565, dated May 12, 2017.
Official Communication in Canadian Patent Application No. 2,827,478, dated Jun. 29, 2017.
Extended European Search Report for Application No. EP12747205, dated Sep. 25, 2014.
Supplementary European Search Report for Application No. EP12747205, dated Jun. 19, 2015.
International Preliminary Report on Patentability in Application No. PCT/US2012/025456, dated Aug. 21, 2013.
Official Communication in Australian Patent Application No. 2017203586, dated Jun. 18, 2019.
Official Communication in Canadian Patent Application No. 2,827,478, dated Mar. 27, 2019.

SYSTEM AND METHODS FOR IDENTIFYING COMPROMISED PERSONALLY IDENTIFIABLE INFORMATION ON THE INTERNET

CROSS-REFERENCE TO RELATED APPLICATIONS

This patent application is a continuation of U.S. patent application Ser. No. 15/341,096, filed on Nov. 2, 2016, which is a continuation of U.S. patent application Ser. No. 14/929,835, filed on Nov. 2, 2015, which is a continuation of U.S. patent application Ser. No. 13/398,471, filed on Feb. 16, 2012, which claims priority from U.S. Provisional Application No. 61/444,433, filed on Feb. 18, 2011, all of which are hereby incorporated by reference.

BACKGROUND

Technical Field

The present invention relates generally to the field of identity theft and more specifically, but not by way of limitation, to data mining of personally-identifying information found on the Internet.

History of Related Art

Identity theft is a mounting concern in commercial transactions. This is particularly true in remote commercial transactions such as, for example, Internet-shopping transactions, that involve little or no direct personal contact between a consumer and a goods or services provider (GSP). It is commonplace for personally-identifying information (PII) to be compromised and utilized for identity theft such as, for example, in a remote commercial transaction. PII, as used herein, refers to information that can be used to uniquely identify, contact, or locate an individual person or can be used with other sources to uniquely identify, contact, or locate an individual person. PII may include, but is not limited to, social security numbers (SSN), bank or credit card account numbers, passwords, birth dates, and addresses. PII that has been obtained by or made available to a third party without proper authorization is referred to herein as compromised PII.

PII can be compromised in a myriad of ways. For example, record keeping for entities such as, for example, healthcare, governmental, financial, and educational institutions, is increasingly and sometimes exclusively electronic. Electronic record keeping introduces new risks for which the entities are frequently ill-equipped to handle. For example, PII is often compromised via stolen hardware, inadequate security procedures, security breaches, or employee carelessness or misconduct.

Another way that PII is frequently compromised is via "phishing." Phishing is the process of attempting to acquire PII by masquerading as a trustworthy entity in an electronic communication. A common example of phishing is a fraudulent email that is made to appear as though it originates from a valid source such as, for example, a national bank. The fraudulent email may incorporate a uniform resource locator (URL) that re-directs its audience to a false website that appears to be a legitimate website for the valid source. In actuality, the false website may be a front for stealing PII as part of a spurious transaction. For example, the false website may request "confirmation" of PII such as, for example, a credit card number or a username and password. The PII may then be stored for later improper use such as, for example, identity theft in a remote commercial transaction.

At least 182,395 instances of phishing were recorded during 2009, as reported by antiphishing.org. This is a forty-two percent increase over a number recorded in 2008. More than 10,745 malicious domains were registered in 2009, which is an increase of fifty-two percent over 2008. Sometimes, a misleading link such as, for example, the URL for the false website described above, may actually originate from a legitimate website but cause traffic to be redirected to an illegitimate website. This type of scam is known as "pharming."

Legislation to curb efforts to compromise PII are largely ineffective. For example, phishing and pharming activities originate from areas around the globe and are thus often protected from prosecution by a particular jurisdiction. Additionally, once PII is compromised, distribution of the compromised PII may be difficult or impossible to prevent. Web sites and forums dedicated to exchanging compromised PII are increasing rapidly in number. Some of these web sites and forums exchange compromised PII though email or secure direct uploads and downloads.

Identity theft resulting from compromised PII is costly to victims and companies alike. The Identity Fraud Survey Report created by Javelin Strategy & Research reported that in 2009 victims averaged a personal cost of $373 and 21 hours of time to resolve identity-theft issues. The annual cost of identity theft currently exceeds $200 billion worldwide. In addition, as a result of new legislation and litigation resulting from compromised PII, companies stand to suffer from lower profit margins, damaged credibility due to negative customer experiences, and eroded brand value. Identity theft also looms as a threat to the advancement of promising consumer-driven, self-service, and cost-savings technologies.

SUMMARY OF THE INVENTION

In one embodiment, a method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

In one embodiment, a computer-program product includes a computer-usable medium having computer-readable program code embodied therein. The computer-readable program code is adapted to be executed to implement a method. The method includes generating, by a computer system, a search-engine query from stored identity-theft nomenclature. The method also includes querying, by the computer system, at least one search engine via the search-engine query. Further, the method includes crawling, by the computer system, at least one computer-network resource identified via the querying. In addition, the method includes collecting, by the computer system, identity-theft information from the at least one computer-network resource. Additionally, the method includes processing, by the computer system, the identity-theft information for compromised personally-identifying information (PII).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

Figure 1:
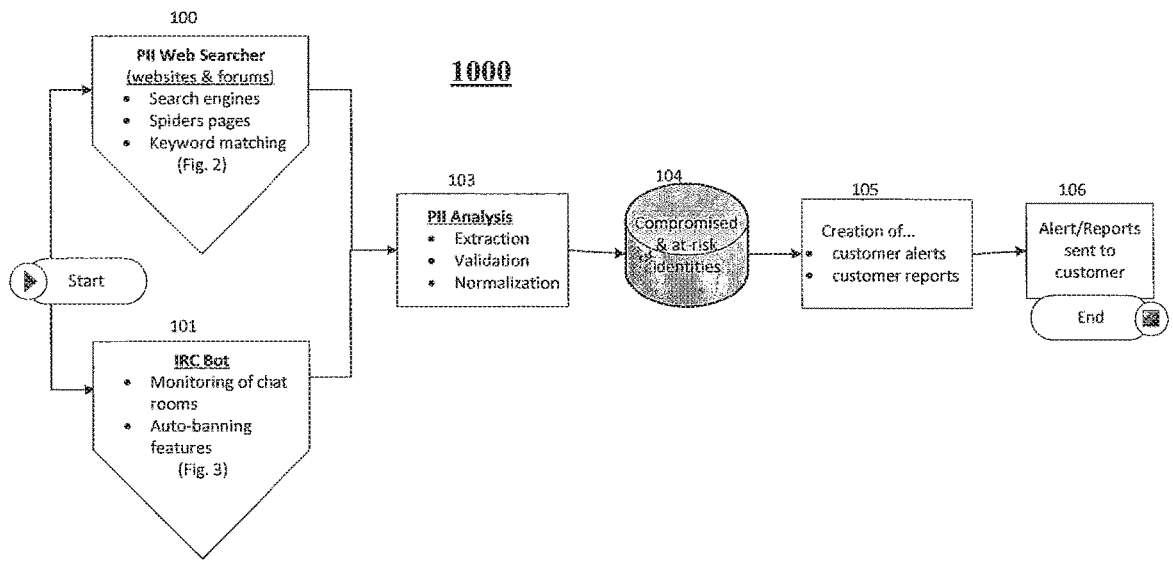
FIG. 1 illustrates a process of identifying compromised PII on the Internet.

FIG. 1 depicts an illustrative flow 1000 for identifying, analyzing, and reporting compromised PII on a computer network such as, for example, the Internet. In a typical embodiment, the flow 1000 may be initiated by one or both of a PII Web Searcher (PWS) 100 and an Internet Relay Chat Robot (IRC bot) 101. One of ordinary skill in the art will appreciate that the PWS 100 and the IRC bot 101 are illustrative in nature and that, in various embodiments, the flow 1000 may be initiated via other types of components that are operable to collect identity-theft information.

As used herein, identity theft generally involves a use of PII that is not authorized by an owner of the PII. Identity theft may include, for example, an unauthorized change to PII or an unauthorized use of PII to access resources or to obtain credit or other benefits. Identity-theft information, as used herein, includes any information that may be used to facilitate discovery or prevention of identity theft. Identity-theft information may include, for example, compromised PII and information related to where or how compromised PII may be found. Identity-theft nomenclature, as used herein, refers to words, phrases, nicknames, numbers, and the like that are determined to be suggestive of identity-theft information or identity theft. In various embodiments, identity-theft may include nomenclature for multiple languages (e.g., English and non-English words).

In various embodiments, the flow 1000 may be initiated via the PWS 100. The PWS 100 may utilize, for example, search engines, web spiders, and keyword-matching features. In a typical embodiment, the search engines and the web spiders may be utilized to collect identity-theft information such as, for example, potential sources of compromised PII. The potential sources of compromised PII may include, for example, websites and forums that facilitate exchange of compromised PII (e.g., by identity thieves). Further, keyword-matching features may be leveraged to analyze the potential sources of identity-theft information using, for example, identity-theft nomenclature. Additionally, the PWS 100 is generally operable to identify and collect other identity-theft information such as, for example, compromised PII, uniform resource locators (URLs), and references to IRC chat rooms (i.e., channels). An illustrative embodiment of the PWS 100 will be described with respect to FIG. 2.

In various embodiments, the flow 1000 may be initiated via the IRC bot 101. Oftentimes, compromised PII is exchanged via chat rooms (e.g., between identity thieves on IRC channels). In a typical embodiment, the IRC bot 101 is operable to crawl the Internet in search of chat rooms (e.g., IRC channels) that are frequented by identity thieves. In a typical embodiment, the IRC bot 101 is operable to monitor such chat rooms for identity-theft nomenclature. Furthermore, the IRC bot 101 is typically operable to identify and collect compromised PII. URLs, references to other IRC chat rooms, and other identity-theft information from such chat moms. Illustrative embodiments of the IRC bot 101 will be described with respect to FIGS. 3, 4, 4A, and 4B.

Oftentimes, if a particular user in a chat room is inactive for a certain period of time, the particular user may be timed out either automatically or by an administrator. In a typical embodiment, the IRC bot 101 may invoke auto-banning features that are operable to maintain an active status and thereby prevent time-out. The auto-banning features may involve simulating a human chat. For example, the auto-banning features may initiate a chat via a generic greeting, reproduce a single word from a monitored conversation, and the like. In a typical embodiment, the simulation of human chat may additionally cause an identity thief to reveal additional identity-theft information such as, for example, compromised PII or a URL to a potential source for compromised PII.

In various embodiments, the IRC bot 101 and the PWS 100 may operate collaboratively in the flow 1000. For example, the IRC bot 101 may provide identity-theft nomenclature such as email addresses, nicknames, and other information that may be used by an identity thief. The IRC bot 101 may further provide, for example, URLs to potential sources of compromised PII. In a typical embodiment, the PWS 100 may crawl the URLs provided by the IRC bot 101 and scan for identity-theft information. The PWS 100 may also search and crawl the Internet using the identity-theft nomenclature provided by the IRC bot 101. In a similar manner, the PWS 100 may discover and send identity-theft information such as, for example, chat rooms, to the IRC bot 101. In a typical embodiment, the IRC bot 101 may monitor the chat rooms provided by the PWS 100.

After identity-theft information is collected by the IRC bot 101 and the PWS 100, the collected identity-theft information may be processed at step 103. In a typical embodiment, the processing of the collected identity-theft information may include an extraction process, a validation process, and a normalization process. In various embodiments, the PWS 100 and the IRC bot 101 may yield extensive amounts of identity-theft information that includes, for example, webpage segments, IRC logs, text files, and the like. In a typical embodiment, the extraction process and the validation process operate to intelligently reduce an amount of the collected identity-theft information that is stored and utilized in subsequent steps of the flow 1000. In a typical embodiment, the normalization process ensures that the identity-theft information is stored efficiently and effectively.

In a typical embodiment, as part of the extraction process, the collected identity-theft information may be processed for compromised PII by one or more parsers that recognize common formats for PII. For example, a parser may identify token-separated data (e.g., tab-delimited data). Similarly, a parser may determine a column type for columns lacking a column header, for example, by analyzing data that is present in particular columns (e.g., recognizing a list of text strings as email addresses). Furthermore, a parser may identify multi-line labeled data such as, for example, "first name: John," and various other labels that may be associated with compromised PII (e.g., recognizing "ccn." "cc" or "credit card" as possible labels for credit-card information). Additionally, by way of further example, a parser may identify identity-theft information taken from encodings that may be present on cards such as, for example, credit cards, driver's licenses, and the like. The encodings may include, for example, track 1 and track 2 magnetic-stripe data.

Additionally, as part of the extraction process, rules may be enforced that require groups of fields to be present in particular compromised PII before allowing the particular compromised PII to be recorded. In a typical embodiment, the requirement that groups of fields be present has the benefit of reducing "false positives" within compromised PII. False positives may be considered elements of compromised PII that are not deemed to be sufficiently private or sufficiently important to merit recordation. In a typical embodiment, false positives may be removed from the collected identity-theft information. For example, an email address that is not accompanied by a password may be considered a false positive and not recorded. In a typical embodiment, a rule may be established that requires, for example, a username or email address to be accompanied by a password in order to be recorded.

In a typical embodiment, the validation process involves analyzing a source of the collected identity-theft information such as, for example, compromised PII, and determining if any elements of the compromised PII are false positives. For example, in a typical embodiment, genealogy websites, phone/address lookup websites, and website log files are common sources of false positives. Compromised PII that is mined from such websites, in a typical embodiment, may be considered false positives and removed from the collected identity-theft information. Conversely, compromised PII mined, for example, from known hacker websites and websites replete with identity-theft nomenclature, in a typical embodiment, may be protected from identification as false positives.

In a typical embodiment, the normalization process ensures that the collected identity-theft information such as, for example, compromised PII, is stored according to a standardized format. For example, standardized data structures and attributes may be established for names, credit-card numbers, and the like. In a typical embodiment, the normalization process facilitates matching, for example, elements of compromised PII to particular individuals to whom the elements correspond. In that way, reports and alerts based on the compromised PII may be more efficiently and more accurately generated. In a typical embodiment, after the extraction process, the validation process, and the normalization process, the collected identity-theft information is recorded in a database at step 104.

At step 105, in a typical embodiment, alerts and reports may be delivered based on, for example, compromised PII that is stored in the database at step 104. In some embodiments, the recordation of any elements of compromised PII at step 104 merits delivery of an alert to an individual to whom the elements correspond. In other embodiments, an individual may only be delivered an alert if, for example, certain elements or combinations of elements are discovered and recorded (e.g., credit-card information or social-security-number). In a typical embodiment, a particular individual may be able to pre-specify an alert-delivery method (e.g., email, telephone, etc.). After step 105, the flow 1000 ends.

Figure 2:
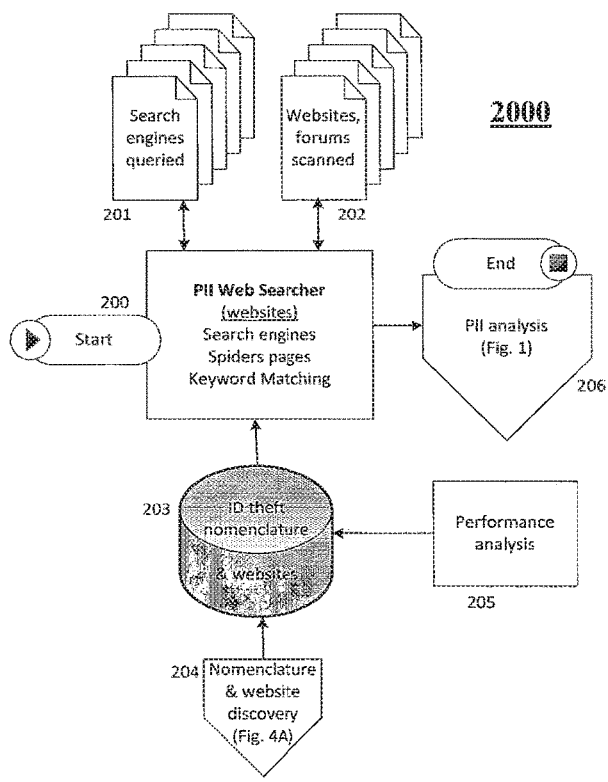
FIG. 2 illustrates a process of data mining for compromised PII using a PII Web Searcher.

FIG. 2 illustrates a flow 2000 for mining compromised PII via a PWS 200. In a typical embodiment, the PWS 200 is similar to the PWS 100 of FIG. 1. The PWS 200 typically accesses a database 203 that includes identity-theft nomenclature and identity-theft websites. Identity-theft websites are websites that have been identified via, for example, identity-theft nomenclature, to be possible sources of compromised PII. The database 203 is typically populated with identity-theft websites and identity-theft nomenclature via a discovery process 204. Illustrative embodiments of the discovery process 204 will be described in further detail with respect to FIG. 4A.

In a typical embodiment, the PWS 200 receives identity-theft nomenclature and identity-theft websites as input from the database 203. The PWS 200 typically queries search engines 201 via keywords from the identity-theft nomenclature. Additionally, the PWS 200 typically crawls websites 202 and scans the websites 202 for the identity-theft nomenclature. In a typical embodiment, the websites 202 include the identity-theft websites received as input from the database 203 and websites identified via queries to the search engines 201. At step 206, compromised PII collected by the PWS 200 may be processed at a processing step 206 in a manner similar to that described with respect to step 103 of FIG. 1.

As new websites and identity-theft nomenclature are added to the database 203 via, for example, the discovery process 204, the database 203 may be optimized via a performance-analysis process 205. In the performance-analysis 205, the identity-theft nomenclature is typically ranked according to a relative significance of compromised PII that is gleaned thereby. In a typical embodiment, the database 203 maintains, for each element of the identity-theft nomenclature, historical information related to compromised PII obtained via that element. In a typical embodiment, each element of the identity-theft nomenclature may be ranked, for example, according to an amount and/or a quality of the compromised PII obtained via that element.

The quality of the compromised PII may be determined, for example, by assigning weights based on a degree of sensitivity of particular elements of compromised PII. For example, in various embodiments, credit-card information and social security numbers may be assigned higher weights than, for example, website account information. In various embodiments, the amount of compromised PII may be, for example, an overall amount of compromised PII historically obtained via particular identity-theft nomenclature. Further, in various embodiments, the amount of compromised PII may be, for example, an amount of PII obtained via particular identity-theft nomenclature in a defined period of time. For example, in some embodiments, it may be advantageous to consider an amount of compromised PII obtained via particular identity-theft nomenclature within the last thirty days.

In a typical embodiment, a score may be computed for each element of identity-theft nomenclature based on, for example, an amount and/or a quality of the compromised PII that is gleaned thereby. In a typical embodiment, a scoring formula for generating the score is configurable. For example, weighting factors may be assigned to the amount and/or the quality of the compromised PII. In that way, greater or less weight may be assigned to the amount and/or the quality of the compromised PII, as may be desired for particular applications. Once scores are generated for each element of the identity-theft nomenclature, the identity-theft nomenclature may be ranked based on the scores.

In a typical embodiment, the PWS 200 may query the search engines 201 via keywords from the ranked identity-theft nomenclature in order to yield, for example, URLs to additional websites. The additional websites may be stored in the database 203. In a typical embodiment, the PWS 200 may crawl and scan the additional websites in a manner similar to that described above with regard to the websites 202. Further, compromised PII collected by the PWS 200 may be processed at a processing step 206 in a manner similar to that described with respect to step 103 of FIG. 1. After the performance-analysis process 205, the flow 2000 ends.

Figure 3:
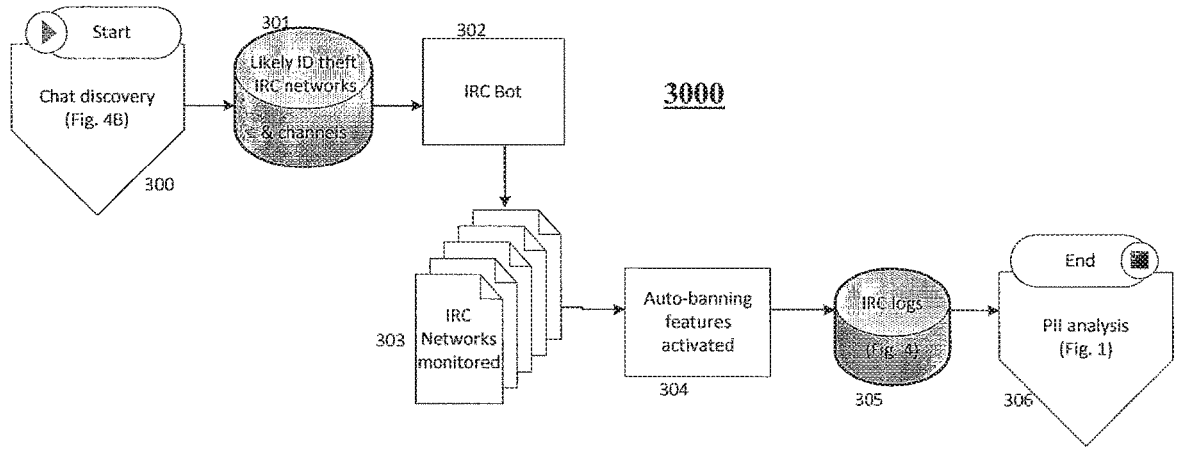
FIG. 3 illustrates a process of data mining for compromised PII using an Internet Relay Chat Robot (IRC Bot)

FIG. 3 illustrates a flow 3000 for compiling databases of compromised PII via an IRC bot. The flow 3000 begins via a chat-room-discovery process 300. During the chat-room-discover process 300, a database 301 is populated. The database 301, in a typical embodiment, includes URLs, for example, to IRC networks and channels likely to relate to identity theft. An illustrative embodiment of the chat-room-discovery process 300 will be described in more detail with respect to FIG. 4B.

In a typical embodiment, an IRC bot 302 receives URLs for IRC networks 303 as input from the database 301. The IRC bot 302 is generally similar to the IRC bot 101 of FIG. 1. The IRC bot 302 typically scans the IRC networks 303 for identity-theft information such as, for example, compromised PII. In a typical embodiment, the IRC bot 302 invokes one or more auto-banning features 304 in order to prevent being timed out on a particular IRC network due to inactivity. For example, the IRC bot 304 may simulate human interaction by interjecting text. In a typical embodiment, the IRC bot 304 is further operable to change Internet Protocol (IP) addresses in order explore IRC networks and chat rooms with efficiency.

Any compromised PII that is found by the IRC bot 302 is typically logged into an IRC log database 305. After being logged, in a typical embodiment, the compromised PII is processed at a processing step 306 in a manner similar to that described with respect to step 103 of FIG. 1. After the processing step 306, the flow 3000 ends.

Figure 4:
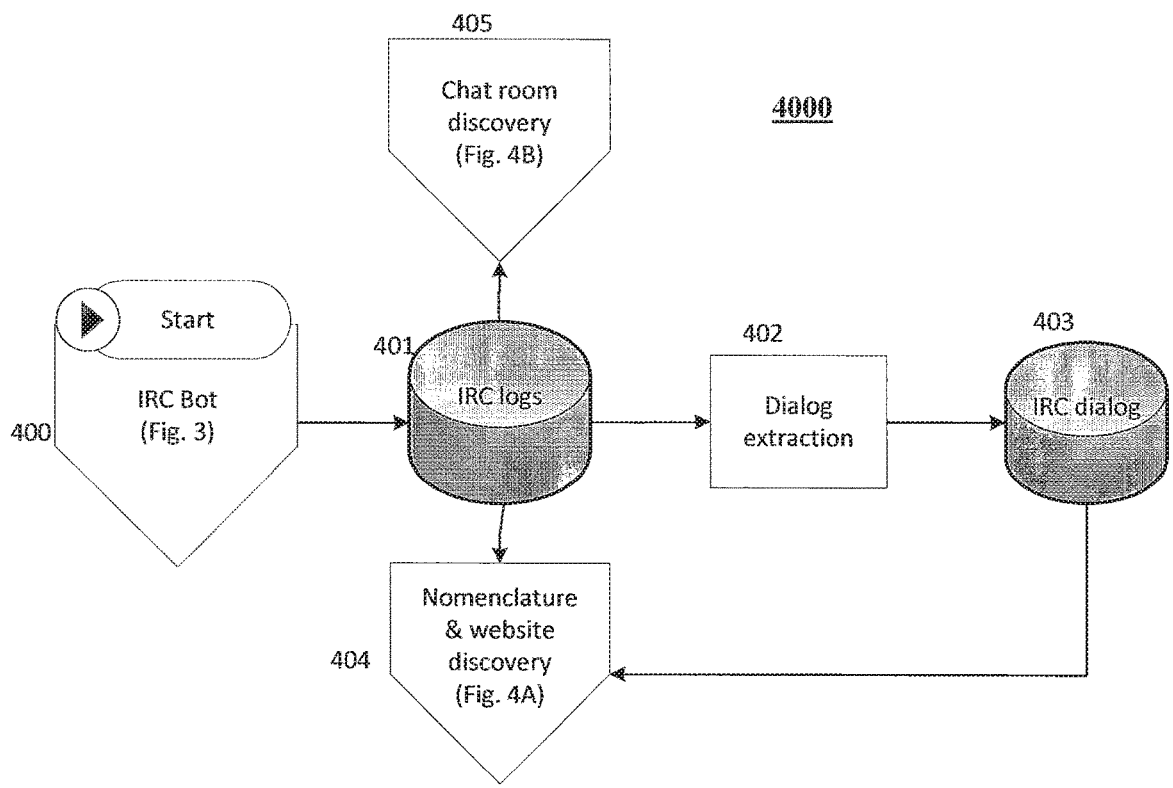
FIG. 4 illustrates a process of chat room, nomenclature and website discovery.

FIG. 4 depicts an illustrative flow 4000 for chat room and website discovery. In particular, the flow 4000 illustrates interactions between an IRC bot 400, a chat-room-discovery process 405, a nomenclature-and-website discovery process 404, a dialog-extraction process 402, an IRC log database 401, and an IRC dialog database 403. The IRC bot 400 is generally operable to scan chat rooms on IRC networks for compromised PII. In a typical embodiment, the IRC bot 400 is similar to the IRC bot 101 of FIG. 1 and the IRC bot 302 of FIG. 3.

After the chat rooms are scanned by the IRC bot 400 as described with respect to FIGS. 1 and 3, identity-theft information such as, for example, compromised PII, is typically logged into the IRC log database 401 as an IRC log. In a typical embodiment, the dialog-extraction process 402 is applied to the IRC log. The dialog-extraction process 402 is typically similar to the extraction process described with respect to step 103 of FIG. 1. In a typical embodiment, compromised PII that is extracted as part of the dialog-extraction process is stored in the IRC dialog database 403. In a typical embodiment, automated spam postings can be distinguished and separated from other dialog.

In a typical embodiment, the IRC log stored in the IRC log database 401 and the extracted compromised PII stored in the IRC dialog database 403 may be provided as inputs to the nomenclature-and-website discover process 404. In a typical embodiment, the nomenclature-and-website discover process 404 discovers new websites and identity-theft nomenclature that may be utilized, for example, by the IRC bot 400, to acquire additional identity-theft information. An illustrative embodiment of the nomenclature-and-website discovery process 404 will be described in more detail with respect to FIG. 4A.

In a typical embodiment, the IRC log stored in the IRC log database 401 may be provided as input to the chat-room-discovery process 405. Although not illustrated, in various embodiments, the extracted compromised PII stored in the IRC dialog database 403 may also be provided as input to the chat-room-discovery process 405. In a typical embodiment, the chat-room-discovery process 405 analyzes the IRC log in order to identify, for example, references to new chat rooms on IRC networks that may be sources of compromised PII. An illustrative embodiment of the chat-room-discovery process 405 will be described with respect to FIG. 4B.

Figure 4A:
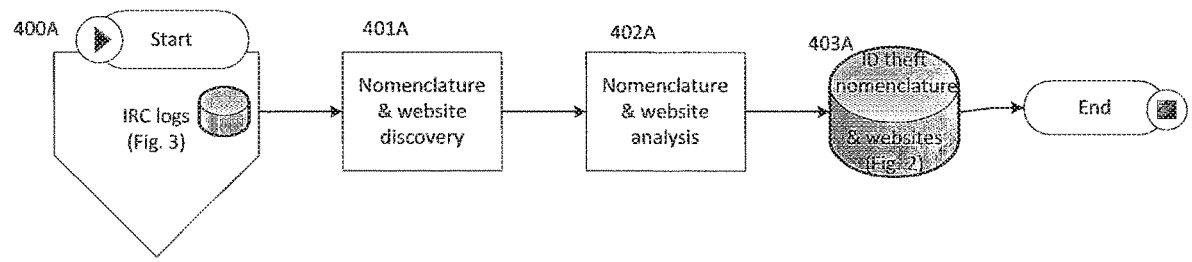
FIG. 4A illustrates a process of nomenclature and website discovery.

FIG. 4A is an illustrative flow 4000A for nomenclature and website discovery. The flow 4000A typically begins with an IRC bot 400A. In a typical embodiment, the IRC bot 400A is similar to the IRC bot 400 of FIG. 4, the IRC bot 300 of FIG. 3, and the IRC bot 101 of FIG. 1. At a discovery step 401A, an IRC log generated by the IRC bot 400A may be analyzed for new identity-theft nomenclature and new websites. The IRC log may be, for example, an IRC log from the IRC log database 401 of FIG. 4. The new identity-theft nomenclature may include, for example, nicknames and email addresses used by participants (e.g., identity thieves) in chat rooms. By way of further example, the new websites may include URLs to websites that are mentioned in chat rooms. In various embodiments, the new identity-theft nomenclature may be utilized by a PWS such as, for example, the PWS 200 of FIG. 2, to search for additional compromised PII as described with respect to FIG. 2.

After the discovery step 401A, an analysis step 402A may occur. In a typical embodiment, the analysis step 402A includes ranking a relative significance of identity-theft websites and forums that are stored, for example, in a database 403A. The identity-theft websites and forums include, for example, the new websites and forums identified at the discovery step 401A. The identity-theft websites and forums may be ranked in a manner similar to that described with respect to the ranking of identity-theft nomenclature in the performance-analysis process 205 of FIG. 2. In a typical embodiment, the analysis step 402A results in storage of the rankings and the new websites in the database 403A. Subsequently, the flow 4000A ends.

Figure 4B:
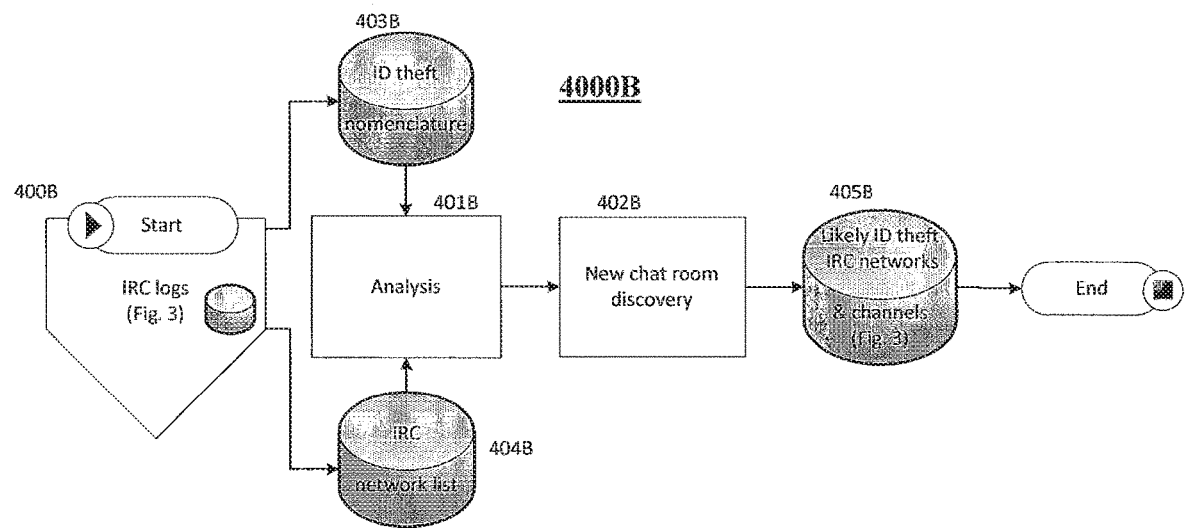
FIG. 4B illustrates a process of chat-room discovery.

FIG. 4B illustrates a flow 4000B for chat-room discovery. In a typical embodiment, the flow 4000B may begin via an IRC bot 400B. In a typical embodiment, the IRC bot 400B is similar to the IRC bot 400A of FIG. 4A, the IRC bot 400 of FIG. 4, the IRC bot 300 of FIG. 3, and the IRC bot 101 of FIG. 1. As described with respect to FIG. 4, the IRC bot 400B may yield IRC logs from monitoring of chat rooms.

Additionally, as described with respect to the discovery process 401A of FIG. 4A, in various embodiments, the IRC bot 400B may yield identity-theft nomenclature and identity-theft websites after engaging in a discovery process. The identity-theft nomenclature and the identity-theft websites may be stored, for example, in a nomenclature database 403B and an IRC-network database 404B.

In a typical embodiment, the IRC logs, the identity-theft nomenclature from the nomenclature database 403B and the chat rooms from the chat-room database 404B may serve as inputs to an analysis step 401B. At the analysis step 401B, the flow 4000B is typically operable to analyze the IRC logs to discover new chat rooms. For example, for a given IRC log, the flow 4000B may analyze a frequency of identity-theft nomenclature. In addition, by way of further example, the flow 4000B may determine how often particular chat rooms are referenced in a given IRC log. In various embodiments, if references to a particular chat room exceed a configurable threshold, the particular chat room may be recorded in a database 405B at step 402B. In some embodiments, the predetermined threshold for overall references may vary based on, for example, a frequency of identity-theft nomenclature in the given IRC log. For example, if the given IRC log has a high frequency of identity-theft nomenclature relative to a configurable value, a single reference may be sufficient for recordation in the database 405B.

In various embodiments, the analysis step 401B may further involve monitoring particular chat rooms from the chat-room database 404B. For example, as described with respect to the analysis step 402A of FIG. 4A, chat rooms in the chat-room database 404B may be ranked. Therefore, in various embodiments, high-ranking chat rooms may be monitored for references to other chat rooms. In a typical embodiment, new chat rooms discovered via the analysis step 401B are stored in the database 405B at step 402B. Subsequently, the flow 4000B ends.

Figure 5:
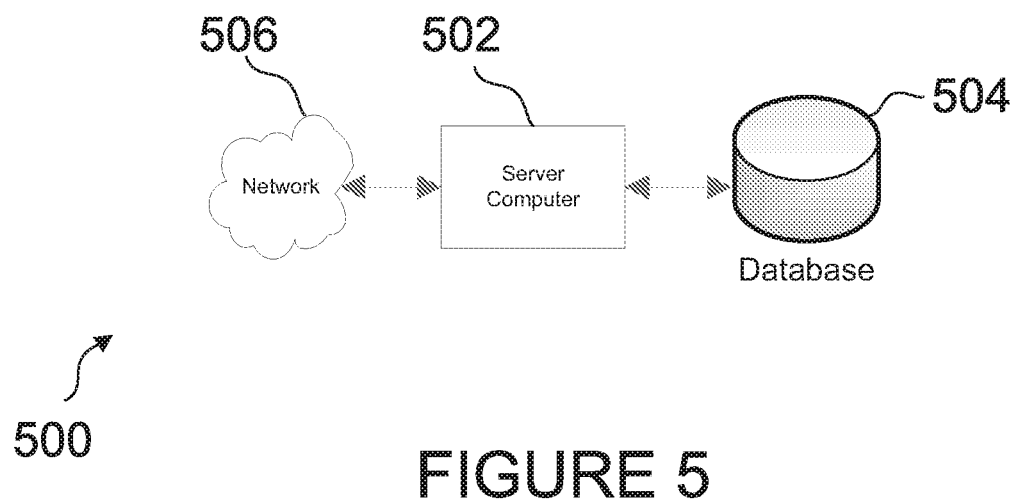
FIG. 5 illustrates a system that may be utilized to facilitate acquisition and utilization of identity-theft information.

FIG. 5 illustrates a system 500 that may be utilized to facilitate acquisition and utilization of identity-theft information. The system 500 includes a server computer 502, a database 504, and a computer network 506. In a typical embodiment, the server computer 502 may have resident and operating thereon a PWS such as, for example, the PWS 200 of FIG. 2. In a typical embodiment, the server computer may have resident and operating thereon an IRC bot such as, for example, the IRC bot 400B of FIG. 4B, the IRC bot 400A of FIG. 4A, the IRC bot 400 of FIG. 4, the IRC bot 300 of FIG. 3, and the IRC bot 101 of FIG. 1. In various embodiments, the server computer 502 may facilitate execution, for example, of the flow 1000 of FIG. 1, the flow 2000 of FIG. 2, the flow 3000 of FIG. 3, and/or the flow 4000 of FIG. 4. In that way, the server computer 502 may be operable to acquire identity-theft information such as, for example, compromised PII, via the computer network 506. The computer network 506 may be, for example, the Internet. The identity-theft information may be stored, for example, in the database 504.

One of ordinary skill in the art will appreciate that the server computer 502 may, in various embodiments, represent a plurality of server computers. For example, the PWS and the IRC bot may, in various embodiments, be resident and operating on distinct physical or virtual server computers. Likewise, in various embodiments, the PWS and the IRC bot may be resident and operating on one physical or virtual server computer. Furthermore, one of ordinary skill in the art will appreciate that the database 504 may, in various embodiments, represent either a single database or a plurality of databases.

Figure 6:
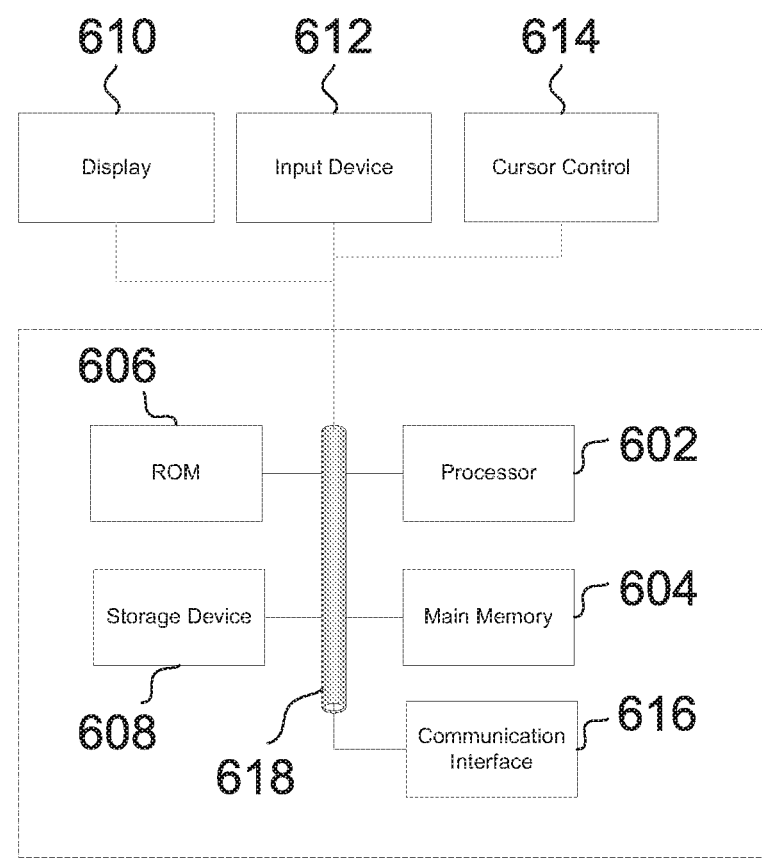
FIG. 6 illustrates an embodiment of a computer system on which various embodiments of the invention may be implemented.

FIG. 6 illustrates an embodiment of a computer system 600 on which various embodiments of the invention may be implemented such as, for example, the PWS 200 of FIG. 2, the IRC bot 400B of FIG. 4B, the IRC bot 400A of FIG. 4A, the IRC bot 400 of FIG. 4, the IRC bot 300 of FIG. 3, and the IRC bot 101 of FIG. 1. The computer system 600 may be, for example, similar to the server computer 502 of FIG. 5. The computer system 600 may be a physical system, virtual system, or a combination of both physical and virtual systems. In the implementation, a computer system 600 may include a bus 618 or other communication mechanism for communicating information and a processor 602 coupled to the bus 618 for processing information. The computer system 600 also includes a main memory 604, such as random-access memory (RAM) or other dynamic storage device, coupled to the bus 618 for storing computer readable instructions by the processor 602.

The main memory 604 also may be used for storing temporary variables or other intermediate information during execution of the instructions to be executed by the processor 602. The computer system 600 further includes a read-only memory (ROM) 606 or other static storage device coupled to the bus 618 for storing static information and instructions for the processor 602. A computer-readable storage device 608, such as a magnetic disk or optical disk, is coupled to the bus 618 for storing information and instructions for the processor 602. The computer system 600 may be coupled via the bus 618 to a display 610, such as a liquid crystal display (LCD) or a cathode ray tube (CRT), for displaying information to a user. An input device 612, including, for example, alphanumeric and other keys, is coupled to the bus 618 for communicating information and command selections to the processor 602. Another type of user input device is a cursor control 614, such as a mouse, a trackball, or cursor direction keys for communicating direct information and command selections to the processor 602 and for controlling cursor movement on the display 610. The cursor control 614 typically has two degrees of freedom in two axes, a first axis (e.g., x) and a second axis (e.g., y), that allow the device to specify positions in a plane.

The term "computer readable instructions" as used above refers to any instructions that may be performed by the processor 602 and/or other component of the computer system 600. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 608. Volatile media includes dynamic memory, such as the main memory 604. Transmission media includes coaxial cables, copper wire, and fiber optics, including wires of the bus 618. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM. DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 602 for execution. For example, the instructions may initially be borne on a magnetic disk of a remote computer. The remote computer can load the instructions into its dynamic memory and send the instructions over a telephone line using a modem. A modem local to the computer system 600 can receive the data on the telephone line and use an infrared transmitter to convert the data to an infrared signal. An infrared detector coupled to the bus 618 can receive the data carried in the infrared signal and place the data on the bus 618. The bus 618 carries the data to the main memory 604, from which the processor 602 retrieves and executes the instructions. The instructions received by the main memory 604 may optionally be stored on the storage device 608 either before or after execution by the processor 602.

The computer system 600 may also include a communication interface 616 coupled to the bus 618. The communication interface 616 provides a two-way data communication coupling between the computer system 600 and a network. For example, the communication interface 616 may be an integrated services digital network (ISDN) card or a modem used to provide a data communication connection to a corresponding type of telephone line. As another example, the communication interface 616 may be a local area network (LAN) card used to provide a data communication connection to a compatible LAN. Wireless links may also be implemented. In any such implementation, the communication interface 616 sends and receives electrical, electromagnetic, optical, or other signals that carry digital data streams representing various types of information. The storage device 608 can further include instructions for carrying out various processes for image processing as described herein when executed by the processor 602. The storage device 608 can further include a database for storing data relative to same.

What is claimed is:

1. A method comprising:
   generating, by a computer system, a search-engine query from identity-theft nomenclature;
   querying, by the computer system, at least one search engine via the search-engine query;
   crawling, by the computer system, at least one computer-network resource identified via the querying;
   collecting, by the computer system, identity-theft information from the at least one computer-network resource;
   processing, by the computer system, the identity-theft information for compromised personally-identifying information (PII); and
   storing the comprised PII.

2. The method of claim 1, wherein processing comprises:
   analyzing the identity-theft information for one or more words indicates a potential presence of the PII; and
   adding the one or more words to the identity theft nomenclature.

3. The method of claim 2, further comprising: generating another search-engine query with the one or more words.

4. The method of claim 1, further comprising: ranking entries within the identity-theft nomenclature, wherein entries are ranked based on at least one of:
   a quantity of PIIs that are compromised as determined based the respective entries;
   a quality of PIIs that are compromised as determined based the respective entries; or
   a relative significance of PIIs that are compromised as identified based on the respective entries.

5. The method of claim 1, wherein the at least one computer-network resource comprises a chat room or a web page.

6. The method of claim 5, wherein the at least one computer-network resource comprises the chat room, the collecting the identity-theft information from the at least one computer-network resource comprises at least one of:
   distinguishing spam postings from another dialog; or
   logging chat dialog into a chat log database.

7. The method of claim 5, the processing the identity-theft information for the compromised PII comprises discovering new chat rooms by:
   determining a frequency that the chat room in one or more chat logs of a plurality of chat logs; and
   responsive to a determination that the frequency exceeds a threshold, recording the chat room for future crawling.

8. The method of claim 1, further comprising: generating and causing transmission of an alert based on the compromised PII.

9. The method of claim 1, wherein the processing the identity-theft information for the compromised PII comprises:
   validating the at least one computer-network resource by determining whether the at least one computer-network resource likely contains false positives for indicating that one or more PIIs are compromised.

10. The method of claim 1, wherein the processing the identity-theft information for the compromised PII comprises normalizing the identity-theft information into a standardized format.

11. A computer system comprising:
    non-transitory computer readable medium for storing software instructions; and
    a hardware processor programmed to execute the software instructions to:
      generate a search-engine query from identity-theft nomenclature;
      query at least one search engine via the search-engine query;
      crawl at least one computer-network resource identified via the querying;
      collect identity-theft information from the at least one computer-network resource;
      process the identity-theft information for compromised personally-identifying information (PII); and
      store the comprised PII.

12. The computer system of claim 11, wherein to process the identity-theft information, the hardware processor is programmed to:
    analyze the identity-theft information for one or more words indicates a potential presence of the PII; and
    add the one or more words to the identity theft nomenclature.

13. The computer system of claim 12, the hardware processor is further programmed to generate another search-engine query with the one or more words.

14. The computer system of claim 11, the hardware processor is further programmed to rank entries within the identity-theft nomenclature, wherein entries are ranked based on at least one of:
    a quantity of PIIs that are compromised as determined based the respective entries;
    a quality of PIIs that are compromised as determined based the respective entries; or
    a relative significance of PIIs that are compromised as identified based on the respective entries.

15. The computer system of claim 11, wherein the at least one computer-network resource comprises a chat room or a web page.

16. The computer system of claim 15, wherein the at least one computer-network resource comprises the chat room, to collect the identity-theft information from the at least one computer-network resource, the hardware processor is programmed to perform least one of:
  distinguishing spam postings from another dialog; or
  logging chat dialog into a chat log database.

17. The computer system of claim 15, wherein the at least one computer-network resource comprises the chat room, to process the identity-theft information, the hardware processor is programmed to:
  determine a frequency that the chat room in one or more chat logs of a plurality of chat logs; and
  responsive to a determination that the frequency exceeds a threshold, record the chat room for future crawling.

18. The computer system of claim 11, the hardware processor is further programmed to: generate and cause transmission of an alert based on the compromised PII.

19. The computer system of claim 11, wherein to process the identity-theft information for the compromised PII, the hardware processor is programmed to:
  validate the at least one computer-network resource by determining whether the at least one computer-network resource likely contains false positives for indicating that one or more PIIs are compromised.

20. The computer system of claim 11, wherein to process the identity-theft information for the compromised PII, the hardware processor is programmed to: normalize the identity-theft information into a standardized format.

* * * * *